No. 842,378. PATENTED JAN. 29, 1907.
J. M. BAKER.
FRUIT AND VEGETABLE BRUSHER, POLISHER, WASHER, AND SELF FEEDER.
APPLICATION FILED APR. 21, 1904.
3 SHEETS—SHEET 1.
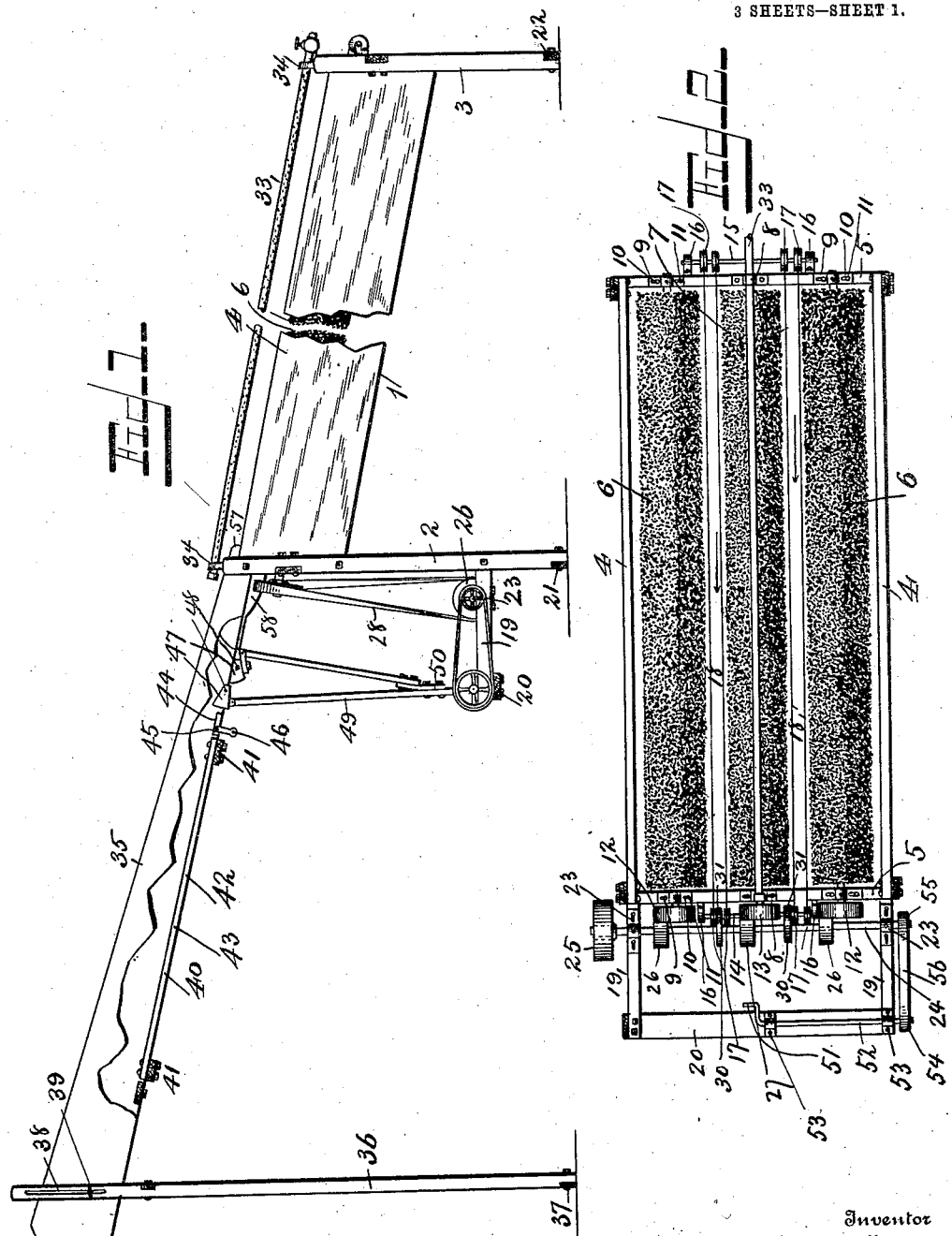
Witnesses
F. L. Orward
L. O. Hiton
Inventor
James M. Baker.
By H. B. Wilson
Attorney No. 842,378. PATENTED JAN. 29, 1907.
J. M. BAKER.
FRUIT AND VEGETABLE BRUSHER, POLISHER, WASHER, AND SELF FEEDER.
APPLICATION FILED APR. 21, 1904.
3 SHEETS—SHEET 2.
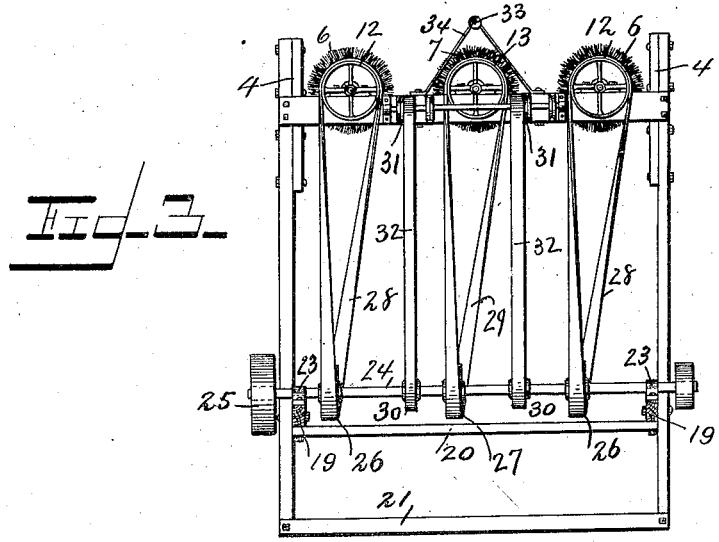
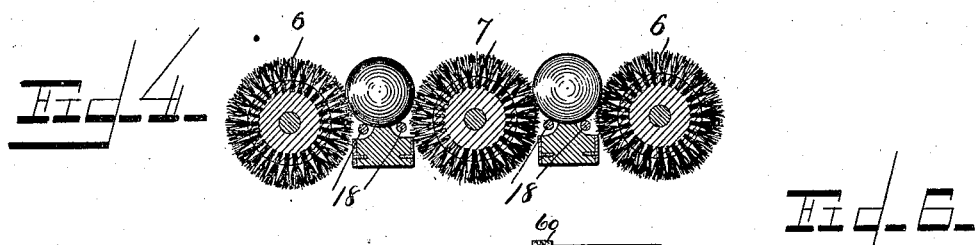
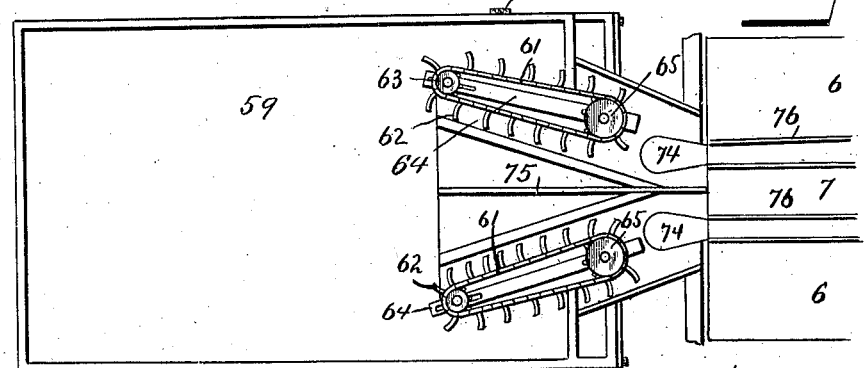
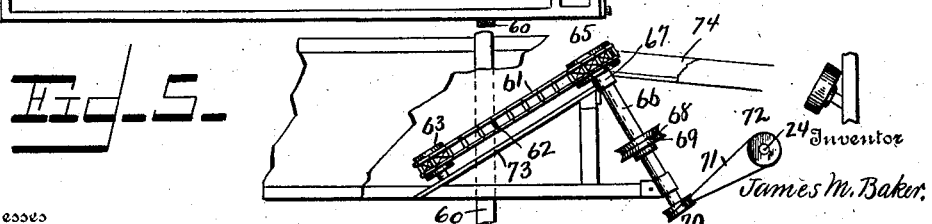
Witnesses
F. L. Ourand.
L. O. Hilton
Inventor
James M. Baker.
By H. B. Willson
Attorney No. 842,378. PATENTED JAN. 29, 1907.
J. M. BAKER.
FRUIT AND VEGETABLE BRUSHER, POLISHER, WASHER, AND SELF FEEDER.
APPLICATION FILED APR. 21, 1904.
3 SHEETS—SHEET 3.
Fig. 7.
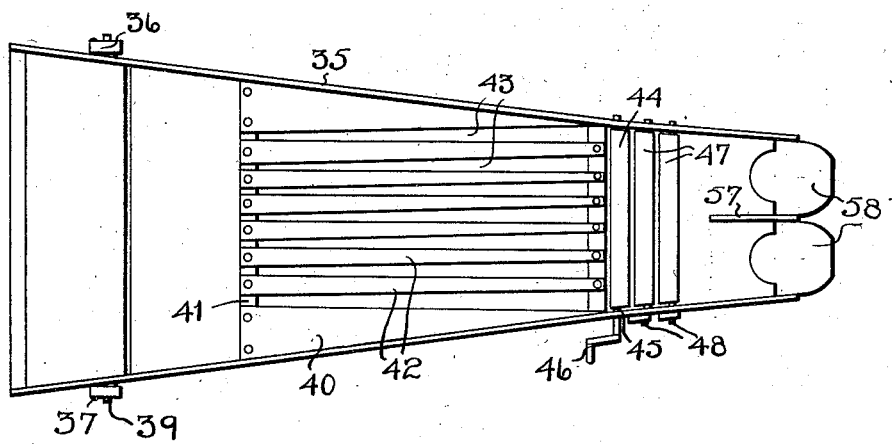
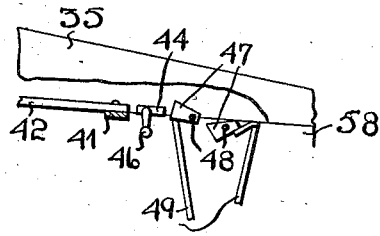
Fig. 8.
Witnesses
Inventor
James M. Baker
by Attorneys

UNITED STATES PATENT OFFICE.

JAMES M. BAKER, OF GLENDORA, CALIFORNIA.

FRUIT AND VEGETABLE BRUSHER, POLISHER, WASHER, AND SELF-FEEDER.

No. 842,378.     Specification of Letters Patent.     Patented Jan. 29, 1907.

Application filed April 21, 1904. Serial No. 204,269.

*To all whom it may concern:*

Be it known that I, JAMES M. BAKER, a citizen of the United States, residing at Glendora, in the county of Los Angeles and State of California, have invented certain new and useful Improvements in Fruit and Vegetable Brushers, Polishers, Washers, and Self-Feeders; and I do declare the following to be a full, clear, and exact description of the invention, such as will enable others skilled in the art to which it appertains to make and use the same.

My invention is an improved self-feeding machine for brushing, polishing, and washing fruit and vegetables; and it consists in the construction, combination, and arrangement of devices hereinafter described and claimed.

The object of my invention is to provide an improved machine of this character which is simple in construction, exceedingly efficient in operation, is of great capacity, durable, runs easily and practically without noise, and which may be used in connection with either a tank having a feed device or with a feeding device for feeding fruits or vegetables directly to the machine without first washing the same.

In the accompanying drawings, Figure 1 is a side elevation of my improved machine in connection with a gravitating feeder. Fig. 2 is a top plan view of the same, showing only a portion of the feeder. Fig. 3 is an end elevation of the same, the feeder being removed. Fig. 4 is a detail transverse sectional view. Fig. 5 is partly an elevation and partly a sectional view, showing the tank connected to the brushing-machine and having means for feeding fruits or vegetables from the tank to the machine. Fig. 6 is a detail top plan view of the same. Fig. 7 is a detail top plan view of the feeding device shown in Fig. 1, and Fig. 8 is a detail sectional view of the same.

I will first describe the machine for cleaning, brushing, and washing fruits and vegetables.

An inclined frame 1 of rectangular form and of suitable size is provided at its corners with supporting-legs 2 3, the former, which are at the inner end of the frame, being longer than the latter, which are at the outer or rear end thereof. The side boards 4 of the frame are connected together at their ends by cross-bars 5, on which are bearings for three rollers or brushes 6 7, the latter being the center roller-brush. The bearings 8 for the brush 7 are fixed on the bars 5. The bearings 9 for the roller-brushes 6 are provided with slots 10, through which the bolts 11 extend that secure them on the bars 5, and thereby the said bearings 9 and the outer roller-brushes 6 are adjustable laterally, so as to properly space them from the center roller-brush 7.

The roller-brushes 6 have their shafts extended at their upper ends and provided with pulleys 12. The center roller-brush 7 is provided at the upper end of its shaft with a similar pulley 13. At opposite ends of the frame are shafts 14 15, which are journaled in bearings 16, that project outwardly from the cross-bars 5. The said shafts are provided at appropriate points with rollers 17, the said rollers of the respective shafts being connected together by retarding-belts or endless cords 18, which are arranged in pairs between the roller-brushes, as shown and, like the roller-brushes, are inclined from end to end of the frame 1. Said retarding-belts serve to support the fruit or vegetables between the rollers, and their upper leads move upwardly, as indicated by the arrows in Fig. 2.

To the corner-posts of the legs 2, at a suitable distance from the lower ends thereof, are secured horizontally and longitudinally disposed bars 19, the outer ends of which are connected together by a cross-bar 20. The lower ends of the legs 2 3 are connected together, respectively, by cross-bars 21 22. On the bars 19, at a suitable distance from the inner ends thereof, are bearings 23, in which is journaled a shaft 24. Said shaft has at one end a power-pulley 25, and the said shaft is provided with pulleys 26 and 27. The pulleys 26 are connected by belts 28 to the pulleys 12 of the outer roller-brushes, and the pulley 27 is connected by a similar endless belt 29 to the pulley 13 of the center roller-brush, whereby power is communicated to the said roller-brushes, as will be understood. The shaft 24 is further provided with pulleys 30, and the shaft 14 is provided with pulleys 31, which are connected to the pulleys 30 by endless belts 32; and hence the endless retarders 18, which are disposed between the roller-brushes, are driven, as will be understood.

Assuming that fruits or vegetables are placed between the roller-brushes at their upper ends on the retarder cords or belts 18, it will be understood that the said brushes, being in revolution, will thoroughly brush the fruit or vegetables and that the endless retarder cords or belts 18 will serve to retard the movement of the same by gravity toward the lower end of the machine and discharge the same therefrom and that the motion of the roller-brushes will tend to rotate the fruits or vegetables in one direction, while the endless retarder belts or cords will tend to rotate the fruits or vegetables in a plane at right angles to the plane of movement imparted thereto by the roller-brushes, the result being that the fruits or vegetables will be turned in all directions as they pass longitudinally between the roller-brushes and will be thoroughly scrubbed, brushed, and polished thereby. The open spaces between the roller-brushes and between the endless retarder cords or belts, which support the fruits or vegetables while they are being brushed, enable the dirt, particles, scale, and the like brushed from the fruit or vegetables to be readily discharged, the result being that the fruit or vegetables will be thoroughly cleaned by the action of the brushes and endless traveling retarders.

To enable the fruit or vegetables to be scrubbed with water by the action of the revoluble roller-brushes, I provide a sprinkling-pipe 33, which is connected to a suitable source of water and is secured above the center brush 7 by suitable supports 34. This pipe is perforated on its under side and serves to discharge water onto the central roller-brush, which causes the said center roller-brush to thoroughly scrub the fruits or vegetables during their passage through the machine, as will be understood. It will be seen that the said pipe may be also perforated in its sides, so as to discharge water also onto the outer roller-brushes, if desired.

I will now describe means for automatically feeding fruit or vegetables to the scrubbing, washing, and polishing machine. As shown in Figs. 1 and 2, there is an inclined feed-trough 35, which contracts laterally toward its lower discharge end. The lower discharge end of the feed-trough is supported by the frame 4. Its outer end is supported by a pair of supports 36, which have their lower ends connected by a cross-bar 37 and which have in their upper portions vertical slots 38. Bolts or screws 39, which screw the sides of the said feed-trough to the said standards, operate in the said slots, so that the inclination of the said feed-trough may be varied at will. Said feed-trough is provided at a point intermediate its ends with a bottom section 40, which comprises cross-bars 41 and longitudinally-disposed slats 42, which are secured on the said cross-bars and are appropriately spaced apart. The openings 43 between the said slats widen toward their lower ends, the said openings serving to discharge leaves and other trash from the fruit or vegetables placed on the upper end of said feed-trough, while the said fruit or vegetables by gravity pass to the lower end of the said feed-trough. Just beyond the lower end of the slatted portion of the bottom of the feed-trough is a transversely-disposed valve 44, which is pivotally mounted, as at 45, and is adapted to be turned to any desired inclination by means of a handle 46. A pair or other suitable number of automatically-operating feed-valves 47 are disposed beyond the lower end of the said valve 44, are pivotally mounted, as at 48, and are simultaneously reversely operated by pitmen 49, which are hinged or otherwise flexibly connected together near their lower ends, as at 50, the lower end of one of the pitmen being connected to and operated by a crank 51 on a shaft 52, which shaft is journaled in bearings 53 on the bar 20 and is provided at one end with a pulley 54. The shaft 24 has a pulley 55, and an endless belt 56 connects the pulleys 54 55, thereby driving the shaft 52.

Between the sides of the feed-trough 35, at the lower contracted end thereof, is a longitudinally-disposed partition-plate 57. At the lower discharge end of the said feed-trough are spouts 58, which may be of the form here shown or of any other suitable form and which serve to discharge the fruit or vegetables into the upper ends of the raceways between the roller-brushes and on the endless traveling retarder cords or belts 18.

It will be understood that the valve 44 when appropriately turned serves to check the gravitating motion of the fruits or vegetables on the bottom of the feed-trough and with the simultaneously reversely operating feed-valves 48 serves to feed the fruits or vegetables from the lower contracted end of the said trough, so that the fruits or vegetables are fed at the required rate of speed to the brushing, polishing, and scrubbing machine.

In lieu of the self-feeding device hereinbefore described I may employ in connection with the machine a feed-tank having self-feeding devices, which I will now describe. The feed-tank 59 is provided with supporting-legs 60, and near the end thereof which is opposite the upper end of the machine are endless traveling inclined feed-chains 61, which are provided with outwardly-extending fingers 62, appropriately spaced apart. The said feed-chains are disposed obliquely with reference to each other to contract the space between them toward the discharge end of the tank. Their lower portions operate on sprocket-wheels 63, which have their bearings on slotted adjustable supporting devices 64, the outer upper portions of the said feed-chains being engaged and operated by sprocket-wheels 65, which are on the upper ends of inclined shafts 66. Said shafts are journaled in suitable bearings 67 are connected together for simultaneous rotation in reverse directions by pulleys 68 and a crossed belt 69, and at the lower end of one of the said shafts is a pulley 70, which is connected by a quarter-turn belt 71 to a pulley 72 on the shaft 24. Inclined bottom plates or boards 73 are disposed under the inclined obliquely-arranged endless traveling feed-chains. The said inclined boards or plates 73 coact with the inner leads of the endless traveling feed-chains to form races for the passage of fruit or vegetables from the tank, the action of the said feed-chains and the fingers with which they are provided being to catch the fruits or vegetables which float in the tank and move the same upwardly over the inclined plates or boards 73 and discharge them from the rear ends thereof. A spout or chute 74 receives the fruits or vegetables as they are discharged from the said feed-chains and conveys the same into the raceways of the machine, at the upper ends thereof, the said chute being divided by a longitudinally-disposed partition 75 and having canvas or other suitable discharge-throats 76. By placing hot water in the tank and putting peaches or similar fruits therein, to loosen the skins, the machine may be employed for peeling the peaches or other fruits or vegetables by the action of the roller-brushes, as will be understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

In a machine of the class described, the combination of inclined roller-brushes spaced apart to form raceways between them, each raceway having a suitably-covered rigid inclined trough-like or concave floor supporting the fruit or vegetables, said floor being provided with endless cords or belts running upwardly on said floor for the more complete turning of the fruit or vegetables between the said brushes, with means for operating said brushes and endless cords or belts, for the purpose specified.

In testimony whereof I have hereunto set my hand in presence of two subscribing witnesses.

JAMES M. BAKER.

Witnesses:
J. S. HUNTOON,
M. A. STAREK.